(12) United States Patent
Doan

(10) Patent No.: US 6,860,286 B2
(45) Date of Patent: Mar. 1, 2005

(54) WATER SUPPLY SYSTEM FOR MULTIPLE DWELLING UNITS

(76) Inventor: Duc T. Doan, 4125 Figueroa St. #301, Los Angeles, CA (US) 90037

( * ) Notice: Subject to any disclaimer, the term of this patent is extended or adjusted under 35 U.S.C. 154(b) by 0 days.

(21) Appl. No.: 10/618,308

(22) Filed: Jul. 14, 2003

(65) Prior Publication Data
US 2004/0069345 A1 Apr. 15, 2004

Related U.S. Application Data
(60) Provisional application No. 60/399,022, filed on Jul. 29, 2002.

(51) Int. Cl.$^7$ ................................................. F16L 5/00
(52) U.S. Cl. ............................ 137/357; 73/197; 73/201
(58) Field of Search ........................... 137/357; 73/197, 73/201

(56) References Cited

U.S. PATENT DOCUMENTS

| | | | | |
|---|---|---|---|---|
| 3,286,133 A | * | 11/1966 | Sturdivan | 361/660 |
| 4,133,021 A | * | 1/1979 | King et al. | 361/660 |
| 5,197,095 A | * | 3/1993 | Bonnet et al. | 379/106.07 |
| 5,252,967 A | * | 10/1993 | Brennan et al. | 340/870.02 |
| 6,056,002 A | * | 5/2000 | Morlok | 137/377 |

* cited by examiner

Primary Examiner—A. Michael Chambers
(74) Attorney, Agent, or Firm—Edward E. Roberts

(57) ABSTRACT

A water supply system for an apartment complex can include individual hot water conduits and cold water conduits for each apartment. Each conduit includes a water meter that enables the owner of the apartment complex to accurately determine the hot water usage and cold water usage of each apartment tenant. The meter system can also be used to locate leakage points in the water supply system, e.g. dripping faucets or continuously running toilets.

14 Claims, 4 Drawing Sheets

WATER LINE DIAGRAM

FIGURE-1 WATER LINE DIAGRAM

FIGURE-2 WATER METER @ EACH TENANT

FIGURE-3 HIGH-RISE BUILDING APPLICATION

WATER SUPPLY SYSTEM FOR MULTIPLE DWELLING UNITS

CLAIM FOR BENEFIT OF EARLIER FILING DATE

This application claims the benefit of U.S. Provisional Application No. 60/399,022 filed on 29 Jul. 2002 and entitled "Water Supply System for Multiple Dwelling Units". This application has the same inventor and subject matter as the said provisional application.

FIELD OF THE INVENTION

This invention relates to a water supply system for multiple dwelling units, e.g. individual apartment units in a multi-apartment building.

BACKGROUND AND SUMMARY OF THE INVENTION

In many present day apartment buildings a central hot water is employed for supplying hot water to the various individual dwelling units (apartments). One problem for the building owner is that it is difficult to know, or determine, the hot water consumption for each individual apartment. One apartment occupant might use a relatively large quantity of hot water, while another apartment occupant might use substantially less hot water. This is somewhat unfair to those apartment residents that tend to economize on hot water usage.

A somewhat similar situation exists with regard to cold water consumption. Usually the cold water coming into the building passes through a single water meter before it is distributed to various branch lines leading to the various apartment units. Some of the cold water is sent to the central water heater, where it is heated before being distributed to the apartment units. Most of the incoming cold water is sent directly from the single water meter to the various points of usage (primarily the apartment units). The main meter at the building water intake provides information only on the cold water flow into the building. The meter is used by the water utility company as a basis for billing the building owner for the total water usage by all the building tenants and cannot be used as a basis for determining individual tenant usage of cold or hot water.

In addition to the "individual tenant water usage" problem, there is also a problem relating to water leakage. In a multi-apartment building it can be difficult for the building owner to detect water leakage in any particular apartment unit. As a practical matter, the building owner or building superintendent cannot go freely or at will into every apartment, on a daily or weekly basis, to inspect the faucets, shower heads, toilets, etc., for slow leakage. Unless an individual apartment tenant reports a leakage condition, the leak can remain undetected for a considerable length of time. Such leakage of water (particularly hot water) can represent a considerable economic loss over time, to the building owner and/or to the building tenants (in the form of higher rents). Water leakage can also be an environmental concern, since the total water resource of the country is, to a certain extent finite and limited.

The present invention is concerned with a multi-apartment water supply system designed to eliminate or minimize the above-described problems, i.e. the problem of determining water consumption in individual apartment units, and the problem of pinpointing or locating water leakage points (i.e. in particular apartment units).

A water supply system of the present invention includes the conventional water meter at the building water intake point, as well as ancillary water meters located in the cold and hot water supply conduits for the individual apartment units.

Each ancillary water meter provides the building owner with information on cold water consumption and hot water consumption by each apartment tenant. By comparing the visual readouts of the various ancillary water meters, the building owner (or operator) can determine which tenants are using relatively small amounts of water (hot or cold). Each tenant can be billed for his individual water usage.

The visual readouts of the ancillary water meters can also be used to pinpoint water leakage points in the building. For example, by keeping daily records of individual apartment water consumption, it is possible to ascertain graduated increases in water consumption associated with continuous water leakage, e.g. a continually dripping faucet or toilet that does not shut off. Daily water consumption that abruptly increases from a normal steady state value is an indication of a potential leaking water condition.

In another scenario, each ancillary water meter can be calibrated to measure very small water flow rates associated with water leakage conditions. By viewing an indicator needle or reading on a properly calibrated water meter, it is possible to detect the leakage flow, e.g. if the low rate-of-flow indication on the meter readout is always moving (i.e. never motionless) there is an indication that one or more of the water consumption devices in the respective apartment is leaking. The person viewing the meter readout can ascertain the leaking condition without actually going into the apartment.

Specific features of the invention will be apparent from the attached drawing and description of an illustrative embodiment of the invention.

DESCRIPTION OF A PREFERRED EMBODIMENT OF THE INVENTION

Figure 1:
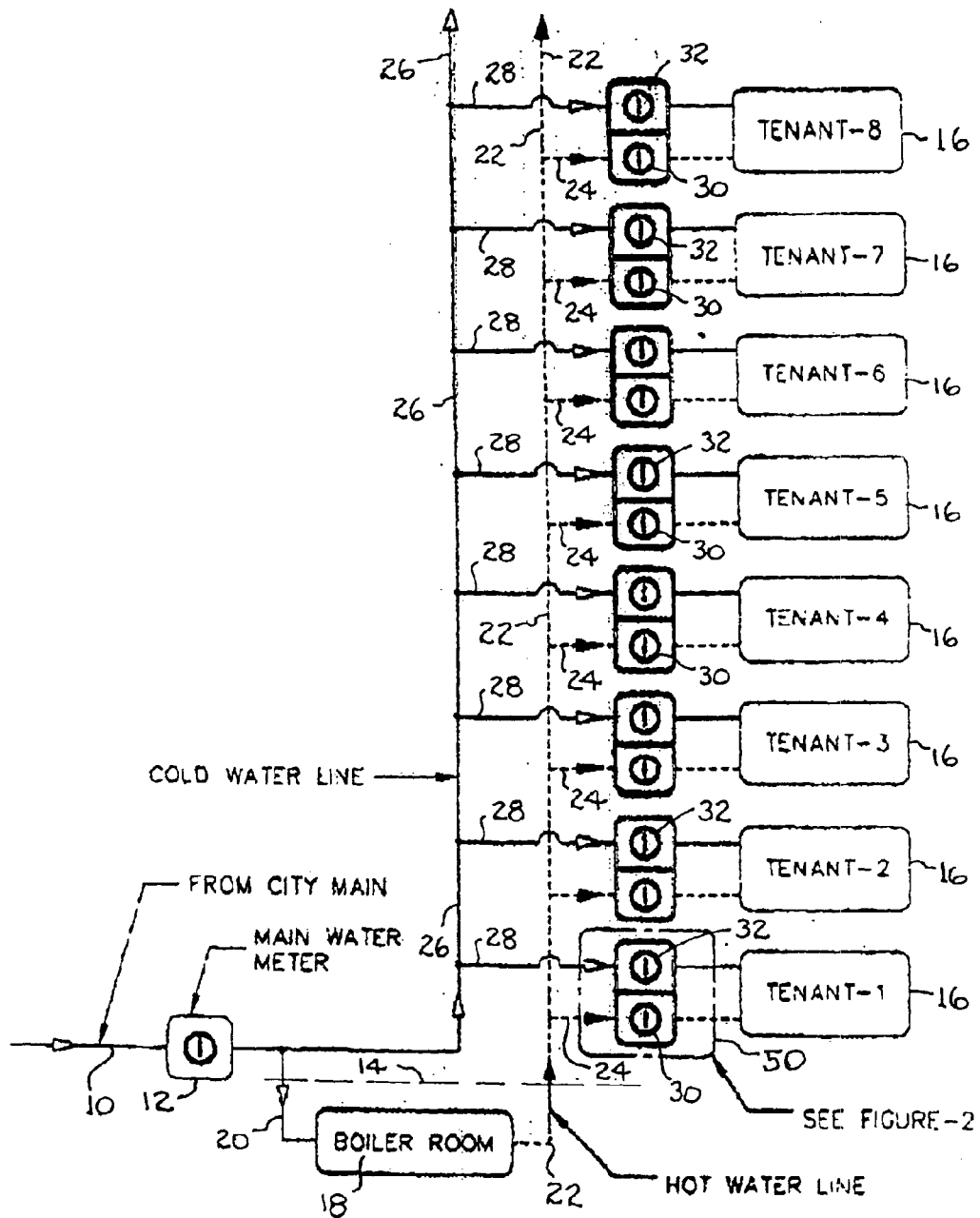
FIG. 1 is a schematic diagram of a water supply system constructed according o the invention.

FIG. 1 schematically shows a water supply system for multiple dwelling units (apartments) constructed according to the invention. The water supply system includes an incoming water line 10 that supplies potable water to a main water meter 12. Typically, the water meter is located outside the apartment building. Meter 12 is used by the water utility company for the purpose of billing the building owner for total water used by all apartment tenants.

In FIG. 1, dashed line 14 designates the demarcation between the boiler area of the building and the other floors of the building. Hardware components located below dashed line 14 would be positioned in the boiler area of the building. The area above dashed line 14 is occupied by individual dwelling units referenced by numeral 16. Each unit represents a specific dwelling unit (or apartment) in the building. The dwelling units depicted in FIG. 1 are merely representative of any number of dwelling units that might be located in the building. For example, in a typical apartment building having four floors, there might be ten apartments per floor, making a total of forty apartments in the building.

An aim of the invention is to provide a water supply system wherein the cold water flow and hot water flow to each dwelling unit (apartment) 16 is individually metered, so that the building owner is enabled to know the cold and hot water consumption by each tenant in the building.

The water supply system depicted in FIG. 1 includes a central water heater (or boiler)18 that receives a supply of cold water from main meter 12, via a cold water line 20. The pressurized water heated by heater 18 flows into a header 22 that connects with multiple hot water supply conduits 24 leading to individual apartment units 16. Each apartment unit has its own hot water supply conduit 24, that connects to the common hot water header 22. Conduits 24 are in parallel flow relation. In FIG. 1, the water flow directions are denoted by arrows. White arrowheads denote cold water flow. Black arrowheads denote hot water flow.

Main water meter 12 supplies cold water to a cold water header 26 that connects with multiple cold water supply conduits 28 leading to individual apartment units 16. Each apartment has its own cold water supply conduit 28, that connects to the common cold water header 26. Conduits 28 are in parallel flow relation.

The system for distributing hot water to the individual apartment units is similar to the system used for distributing cold water to the apartment units, except for the source of the water. In one case, heater 18 is the source, whereas in the other case main meter 12 is the water source.

Each hot water supply conduit 24 contains, or includes, an ancillary water meter 30 that measures water flow through the respective conduit. Similarly, each cold water supply conduit 28 contains an ancillary water meter 32 that measures water flow through the respective conduit. Meters 30 and 32 may be similarly constructed.

Various meter styles or types can be used for ancillary meters 30 and 32. For example, the meter can be a drum type meter that includes a rotatable chamber of known volumetric capacity that alternately fills and empties to produce shaft rotation that can drive a counting mechanism. Alternately, each water meter can be a rotary impeller type unit. In such a unit, water flowing from an inlet to an outlet is forced to flow through a rotary impeller. Impeller rotation is related to rate of water flow. A gear system is driven by the impeller shaft to produce a visual readout. Typically, the readout includes three or more pointers or wheels that rotate at differential speeds to indicate the digits of the total flow value through the meter. The readout can also be electronic in nature, which facilitates computer tabulation of individual tenant water consumption.

Figure 2:
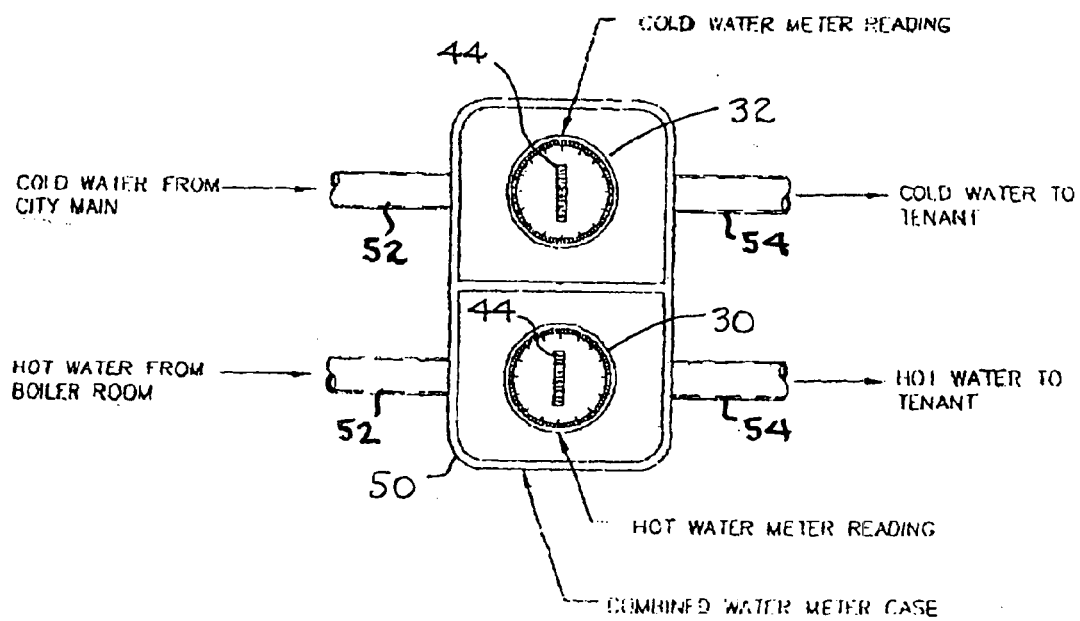
FIG. 2 is a plan view taken of a water meter assembly that can be employed in the FIG. 1 water supply system.

In preferred practice of the invention, the ancillary water meters 30 and 32 are grouped together in near proximity to each respective dwelling unit (16). Alternately the meters can be placed in the basement or on the roof (not shown) in a single location where applicable, so that the readings for the hot water consumption for all apartments (dwelling unit) can be taken together conveniently. In FIG. 2, numeral 50 denotes a hot water meter and cold water meter grouping or assembly for one dwelling unit.

The water supply system shown in FIG. 1 is advantageous in that the building owner is able to determine the hot water consumption and cold water consumption for each apartment in the apartment complex. Each apartment tenant can be accurately billed for the individual water consumption, without any estimating or guessing on the part of the building owner.

The illustrated water supply system is also advantageous in that the building operator is enabled to ascertain the location of any measurable water leakage without repeatedly visiting each apartment in the apartment complex. The location of a suspect water leak can be ascertained in one or two ways.

In one scenario, the daily or monthly water consumption records for any particular apartment can be compared, to identify situations where the water consumption abruptly increases from a normal steady state value. An abrupt increase in water consumption (hot or cold water) is an indication of a suspected water leak, e.g. a dripping faucet or a toilet that will not stop running.

In another, scenario the individual ancillary water meter 30 or 32 is calibrated so that one of the readout pointers or wheels 44 (FIG. 2) measures a very slow flow rate. If that pointer or wheel moves continuously (or intermittently on a continuing basis) that is an indication of a leakage condition.

The drawings show a water supply system wherein the individual water meters 30 and 32 have visual readouts. However, the invention can also be practiced where the meter readouts are electronic. By linking the meter electronic readouts to a computer, it is possible to let the computer make the desired computations and tabulations.

The schematic depicted in FIG. 1 represents a preferred embodiment of the invention. However, the invention can be practiced in various forms and arrangements.

Figure 3:
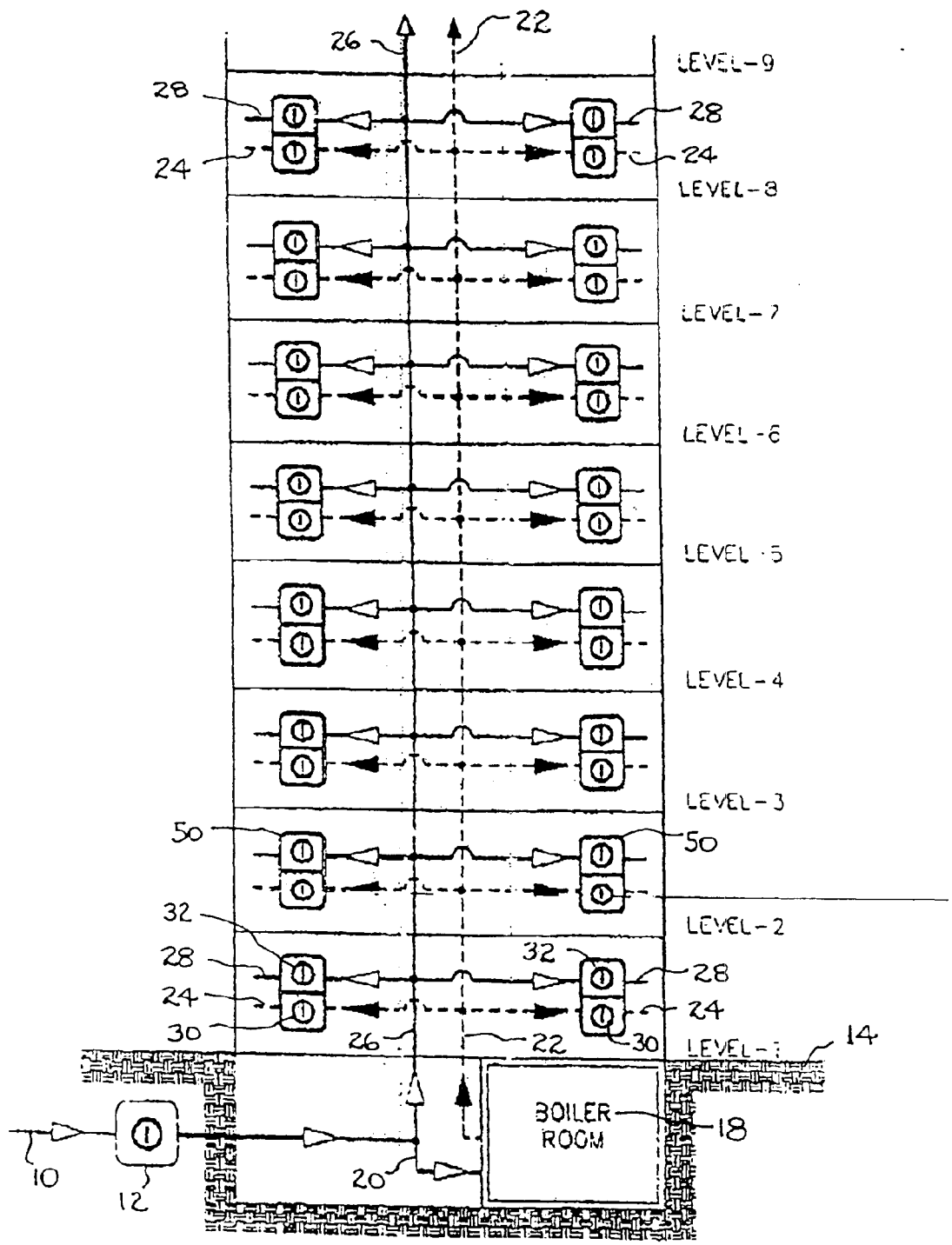
FIG. 3 is a top plan view of a housing for a pair of water meters of the type shown in FIG. 2.

FIG. 3 shows in somewhat detail, a water supply system embodying the FIG. 1 features. FIG. 3 shows the boiler room wall and multiple dwelling units on each level (floor) of the building, so that an actual physical arrangement can be more readily visualized. In all material respects the FIG. 3 system is the same as the FIG. 1 system. As indicated above, the invention can be practiced in various arrangements.

The individual meter assemblies 50 can be constructed in various ways. FIG. 2 shows a unitary water meter assembly 50, wherein the water flows horizontally into and out of each water meter. Each meter has a horizontally oriented inlet pipe 52 and a horizontally oriented outlet pipe 54.

Figure 4:
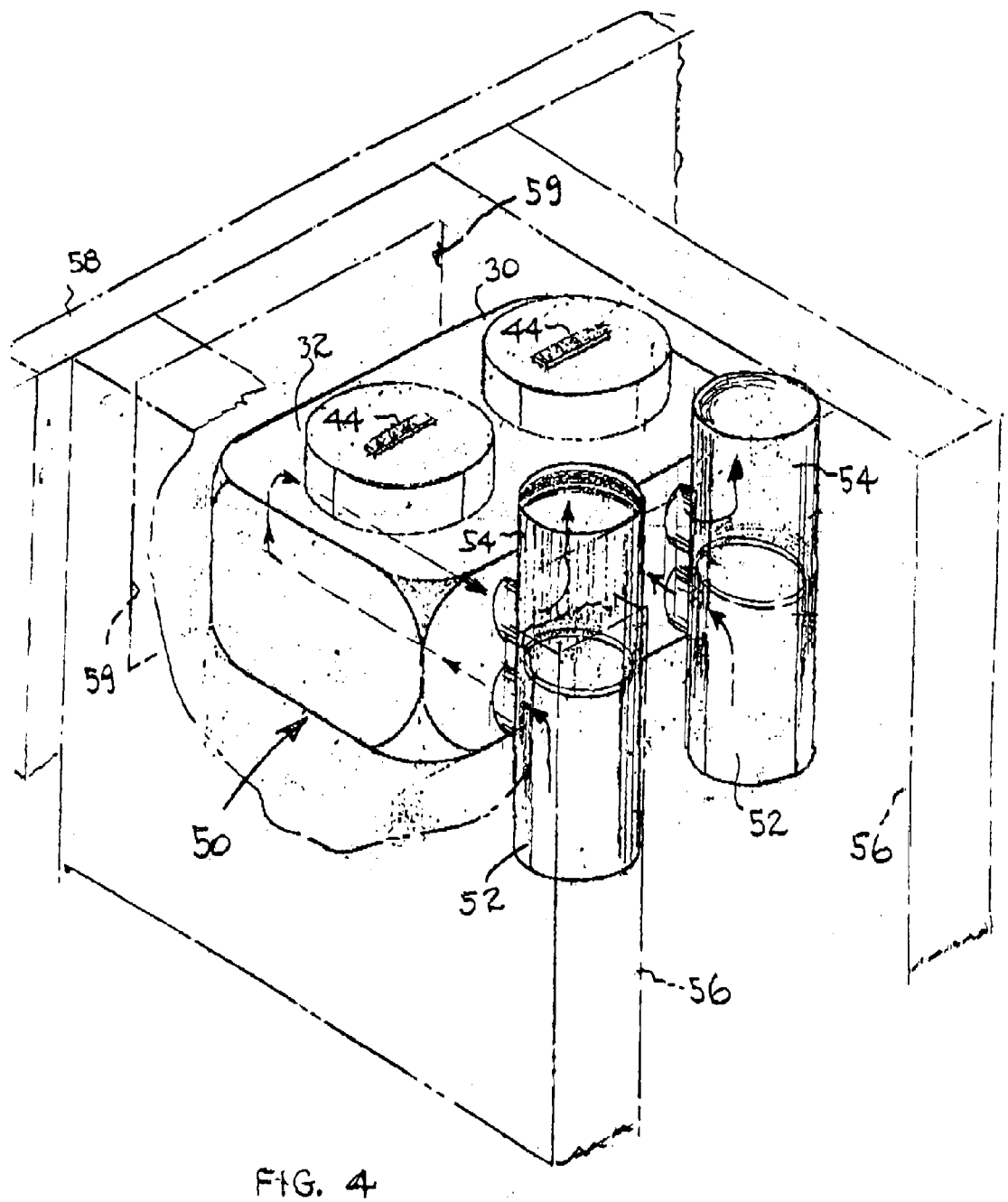
FIG. 4 shows another water meter assembly that can be used in practice of the invention.

FIG. 4 shows a unitary water meter assembly 50, wherein the water flows vertically as it approaches and departs the respective meter. Each water meter has a vertically oriented inlet pipe 52 and a vertically oriented outlet pipe 54.

As shown in FIG. 4, the water meter assembly is located in a wall between two vertical wall studs 56, 56. The exterior wall panel 58 has an opening 59 that enables a person to scan the water readout 44. A hinged door (not shown) would normally close opening 59. Wall panel 58 would usually form one wall of an exterior hallway at the entrance to each dwelling unit, such that the person can take water meter readings without going into the dwelling unit.

What is claimed:

1. A water supply system for multiple dwelling units comprising a cold water source that includes a main water meter and a cold water header from said main water meter for feeding said multiple dwelling units, a water heater receiving cold water from said main water meter and a hot water header from said water heater for feeding said multiple dwelling units, a hot water supply conduit connected to said hot water header for each dwelling unit, and a cold water supply conduit connected to said cold water header for each dwelling unit, each said supply conduit having an ancillary water meter for measuring water flow therethrough; and said ancillary water meters for each dwelling unit, one for hot water and one for cold water, have means for measuring flow characteristics and providing electronic readouts of said characteristics suitable for computer processing.

2. The water supply system of claim 1 wherein the respective hot water and cold water meters for each dwelling unit are built together as a unitary assembly and located proximate the main source of the hot and cold water supply to the associated dwelling unit.

3. The water supply system of claim 1 wherein each said ancillary water meter includes means for measuring flow characteristics includes measuring of volume, flow rates, surges, total consumption over time, and intermittent flow of the water consumed by the associated individual unit.

4. The water supply system of claim 3 wherein said electronic readouts of said flow characteristics are selected for computer processing to determine water delivery problems including water line leakage, dripping faucets, running toilets, and the like.

5. The water supply system of claim 3 wherein said electronic readouts are linked to a computer, said computer providing computations and tabulations of said water flow characteristics.

6. The water supply system of claim 5 wherein said computations and tabulations provide water delivery data including volume, leakage, pressure, surges, and periodic comparisons of selected data.

7. The water supply system of claim 6 wherein the grouped pairs of ancillary water meters are located proximate the associated individual unit for external access and monitoring.

8. A water supply system for multiple dwelling units comprising:

a cold water source that includes a main water meter;

a cold water header from said main water meter providing a common supply to each said multiple dwelling units;

a water heater receiving cold water from said main water meter;

a hot water header from said water heater providing a common supply to each said multiple dwelling units;

a cold water supply conduit for each dwelling unit connected to said cold water header;

a hot water supply conduit for each dwelling unit connected to said hot water header;

each said cold water conduit and said hot water conduit having an in-line water meter for measuring water flow characteristics therethrough and providing electronic readouts of said characteristics; and said in-line water meters for each dwelling unit, grouped as a pair consisting of one for hot water and one for cold water, are combined together as a unitary assembly.

9. The water supply system of claim 8 wherein each said in-line water meter includes means for measuring flow characteristics includes measuring of volume, flow rates, surges, total consumption over time, and intermittent flow.

10. The water supply system of claim 8 wherein each said in-line water meter flow characteristics of water consumed by the associated individual unit are selected for computer processing to determine water delivery problems including water line leakage, dripping faucets, running toilets, and the like.

11. The water supply system of claim 10 wherein said unitary assembly is located proximate the main source of the hot and cold water supply to the associated dwelling unit.

12. The water supply system of claim 10 wherein said electronic readouts are linked to a computer, said computer providing computations and tabulations of said hot and cold water flow characteristics of each unit.

13. The water supply system of claim 12 wherein said computations and tabulations provide continuous water delivery data such as volume, volume changes, leakage and leakage levels, and surges, as well as providing periodic use comparisons of said water delivery data.

14. The water supply system of claim 13 wherein said water delivery data is processed in said computer to monitor, store and provide a continuing record of the water flow characteristics of each dwelling unit.

\* \* \* \* \*